US011654412B2

(12) United States Patent
Masuda et al.

(10) Patent No.: US 11,654,412 B2
(45) Date of Patent: May 23, 2023

(54) HYDROGEN GAS PRODUCING APPARATUS USING PHOTOCATALYST

(71) Applicants: TOYOTA JIDOSHA KABUSHIKI KAISHA, Toyota (JP); TOYODA GOSEI CO., LTD., Aichi (JP)

(72) Inventors: Taizo Masuda, Yokohama (JP); Kenichi Okumura, Gotemba (JP); Ryota Tomizawa, Toyota (JP); Atsuki Yoshimura, Susono (JP)

(73) Assignees: TOYOTA JIDOSHA KABUSHIKI KAISHA, Toyota (JP); TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 17/495,625

(22) Filed: Oct. 6, 2021

(65) Prior Publication Data

US 2022/0111349 A1 Apr. 14, 2022

(30) Foreign Application Priority Data

Oct. 11, 2020 (JP) .............................. JP2020-171600

(51) Int. Cl.
*B01J 16/00* (2006.01)
*B01J 19/00* (2006.01)
(Continued)

(52) U.S. Cl.
CPC ........... *B01J 19/122* (2013.01); *B01J 16/005* (2013.01); *B01J 19/0013* (2013.01); *C01B 3/042* (2013.01);
(Continued)

(58) Field of Classification Search
CPC . B01J 16/00; B01J 16/005; B01J 19/00; B01J 19/006; B01J 19/0013; B01J 19/08;
(Continued)

(56) References Cited

U.S. PATENT DOCUMENTS

2009/0321244 A1* 12/2009 Smith ..................... C01B 3/042
422/600
2011/0286907 A1 11/2011 Nakamura et al.
2012/0063967 A1 3/2012 Tokuhiro et al.

FOREIGN PATENT DOCUMENTS

JP H09-510657 A 10/1997
JP 2003-251197 A 9/2003
(Continued)

*Primary Examiner* — Natasha E Young
(74) *Attorney, Agent, or Firm* — Oliff PLC (57) ABSTRACT

In an apparatus producing hydrogen gas by the decomposition reaction of water using photocatalyst, its miniaturization is achieved while suppressing the decrease of production efficiency of hydrogen gas as low as possible or improving the efficiency. The apparatus 1 comprises a container portion 2 receiving water W; a photocatalyst member 3 immersed in the water, having photocatalyst which generates excited electrons and positive holes when irradiated with light, causes a decomposition reaction of the water and generates hydrogen gas; a light source 4 emitting the light irradiated to the photocatalyst member; and a heat exchange device 7 conducting waste heat of the light source to the water in the container portion; wherein the water to be decomposed on the photocatalyst member in the container portion is warmed by the waste heat of the light source by the heat exchange device.

24 Claims, 5 Drawing Sheets

(51) Int. Cl.
  *B01J 19/12* (2006.01)
  *B01J 19/24* (2006.01)
  *C01B 3/04* (2006.01)

(52) U.S. Cl.
  CPC .. *B01J 2219/089* (2013.01); *B01J 2219/0871* (2013.01); *B01J 2219/0892* (2013.01); *B01J 2219/1203* (2013.01)

(58) Field of Classification Search
  CPC . B01J 19/12; B01J 19/122; B01J 19/24; B01J 2219/00; B01J 2219/08; B01J 2219/0871; B01J 2219/0873; B01J 2219/0881; B01J 2219/089; B01J 2219/0892; B01J 2219/12; B01J 2219/1203; C01B 3/00; C01B 3/02; C01B 3/04; C01B 3/042
  See application file for complete search history.

(56) References Cited

FOREIGN PATENT DOCUMENTS

| | | |
|---|---|---|
| JP | 2013-234077 A | 11/2013 |
| JP | 2015-218103 A | 12/2015 |
| JP | 2016-108181 A | 6/2016 |
| JP | 2017-024956 A | 2/2017 |
| WO | 96/06675 A1 | 3/1996 |
| WO | 2020/039205 A1 | 2/2020 |

\* cited by examiner

FIG.8A
at Rated Current

FIG.8B
at 1/2 Current

FIG.8C
at 1/4 Current

HYDROGEN GAS PRODUCING APPARATUS USING PHOTOCATALYST

CROSS-REFERENCE TO RELATED APPLICATION

This application claims priority to Japanese Patent Application No. 2020-171600 filed on Oct. 11, 2020, which is incorporated herein by reference in its entirety including the specification, drawings, and abstract.

TECHNICAL FIELD

This invention relates to a hydrogen gas producing apparatus, and more specifically to a device which produces hydrogen gas by the decomposition reaction of water using photocatalyst.

BACKGROUND ART

Hydrogen gas is expected to be used as a next generation clean fuel which does not produce carbon dioxide. Since the hydrogen gas can be produced by the decomposition reaction of water by light energy with photocatalyst, there have been proposed various techniques of producing hydrogen gas using photocatalyst. For instance, JPH9-510657 and JP2003-251197 disclose a photocatalyst which induces the decomposition reaction of water by irradiation of ultraviolet light or visible light to produce hydrogen gas and its preparation method. JP2013-234077 discloses a structure of a hydrogen production device comprising an oxidation reaction means of water by light, from ultraviolet to visible, in the sunlight using photocatalyst, and a reduction reaction means of water using the heat of light, from infrared to visible, in the sunlight. JP2015-218103 proposes a structure of a hydrogen producing apparatus wherein water into which photocatalyst particles are dispersed is circulated in a housing having a light receiving window so that the decomposition reaction of water by light, producing hydrogen gas will occur. JP2017-24956 proposes a structure of a hydrogen generation system in which, by irradiating light accumulated by a sunlight condenser to a receiver including an electrode consisting of photocatalyst placed in water, charged particles in the photocatalyst are excited so that water around them will be electrolyzed, producing hydrogen gas continuously. In this regard, in JP2016-108181, though not a technique of producing hydrogen gas, there has been disclosed a technique that a carbon plate material of carbon allotrope of sp3 crystal structure is immersed in a solvent in which carbon dioxide is dissolved, and by irradiating the solvent with ultraviolet light while raising the temperature of the solvent by a heater, the carbon material is excited such that C=O bonds in the carbon dioxide are separated, generating methane with carbon monoxide generation.

SUMMARY

In techniques of producing hydrogen gas by irradiating light to photocatalyst immersed in water to cause the decomposition reaction of water as described above, it is advantageous that the size of an apparatus or a system can be made as small as possible. As one way for this, it is considered to increase the amount of hydrogen gas produced in photocatalyst per unit quantity by increasing the density of light (light intensity) irradiated on the photocatalyst per unit quantity so as to increase the densities of excited electrons and positive holes generated in the photocatalyst. For instance, in a case that the solar energy, which is one of renewable energies, is used for the production of hydrogen gas, if photocatalyst is irradiated with the sunlight as it is, its light density is comparatively low so that it would be required to make the space occupied by the photocatalyst large in order to supply a large amount of light energy to the photocatalyst, and thus, by raising higher the density of light irradiated to the photocatalyst, it will become possible to make the space occupied by the photocatalyst smaller and thereby make the size of the system or device for the production of hydrogen more compacted. In this respect, however, according to the research by the inventors of this invention, as explained in detail in the column of embodiments later, surprisingly, it was found that, when the light density irradiated to photocatalyst was increased, the production efficiency of hydrogen gas (the produced amount of hydrogen gas per incident light amount) decreased. This is considered because, even if the densities of excited electrons and positive holes generated in the photocatalyst are increased by the increase of light intensity, the speed of the decomposition reaction of excited electrons, positive holes and water molecules is so slow that an excited electron and a positive hole will recombine to one another before reacting with a water molecule, respectively, and thereby the light energy is not effectively used for the production of hydrogen gas. From this fact, it has been revealed that, when the density of the light irradiated to photocatalyst is simply increased for making a hydrogen production system or device compacted, the production efficiency of hydrogen gas per the irradiated light amount decreases and thus the miniaturization and the efficiency increasing of the apparatus would be incompatible with one another.

By the way, in the further research of the inventors of this invention, it was also found out that the production efficiency of hydrogen gas increased with the increase of the temperature of water which is the reactant. Thus, in the miniaturization of the hydrogen gas producing apparatus or system, it is considered that the decrease of the efficiency of the hydrogen gas production due to the increase of the density of the light irradiated on photocatalyst can be compensated by raising the water temperature. In that case, if the waste heat of a light source which generates the light irradiated to the photocatalyst can be used for warming the water instead of using a different heater which supplies energy from the outside, more concretely, if, in addition to the radiant heat from the light source to the water, the light source is equipped with a heat exchange device which directly conducts the waste heat to the water so that it can be warmed sufficiently for raising the production efficiency of hydrogen gas, it becomes possible to improve more the utilization efficiency of the energy in connection with the hydrogen gas production. This knowledge is used in the present embodiment.

Thus, the main object of the present embodiment is to provide an apparatus which produces hydrogen gas by the decomposition reaction of water using photocatalyst, having a structure which can achieve the miniaturization of the apparatus while suppressing the reduction of the production efficiency of hydrogen gas as low as possible or while improving the production efficiency of hydrogen gas.

Moreover, another object of the present embodiment is to provide an apparatus as described above, which is so constructed that the utilization efficiency of the energy in connection with hydrogen gas production can be more improved.

According to one manner of the present embodiment, the above-mentioned object is achieved by a hydrogen gas producing apparatus, comprising:

a container portion which receives water, a photocatalyst member placed in the container portion to be immersed in the water therein, which member has photocatalyst which generates excited electrons and positive holes when it is irradiated with light, causes a decomposition reaction of the water which decomposes water into hydrogen and oxygen and produces hydrogen gas;

a light source emitting the light which is irradiated to the photocatalyst member and induces the decomposition reaction of the water; and a heat exchange device which conducts waste heat of the light source to the water in the container portion;

wherein the water to be decomposed on the photocatalyst member in the container portion is warmed by the waste heat of the light source by the heat exchange device.

In the above-mentioned structure, as noted above, a "photocatalyst" may be a substance which can cause the decomposition reaction of water when it is irradiated with light, and reduce water to generate hydrogen gas. The "photocatalyst member" may be a member formed of the photocatalyst material itself or a member formed by fixing the photocatalyst material on an arbitrary board or substrate. Typically, the "light source" may be of arbitrary type, which receives supply of electric power and emits the light to be absorbed into the photocatalyst and induce the decomposition reaction of water. Further, in order that the light irradiated to the photocatalyst may efficiently be absorbed into the photocatalyst and generate excited electrons and positive holes, the emission wavelength of the light source is preferably chosen to fall into a wavelength band in which the quantum yield of the photocatalyst exceeds a predetermined threshold value (which may be chosen arbitrarily). In this respect, as illustrated in the column of the embodiment later, the quantum yield of a typical photocatalyst increases rapidly when the wavelength of irradiated light becomes lower than near a certain wavelength. Accordingly, the light source may be chosen so that the emission wavelength of the light source will be in the shorter wavelength side than the wavelength at which the rapid increase of the quantum yield of the photocatalyst occurs. For the photocatalyst to be used in the present embodiment, for example, $SrTiO_3$ (strontium titanate), $Ga_2O_3$ (gallium oxide), GaN (gallium nitride), $NaTaO_3$ (sodium tantalate), $TiO_2$ (titanium oxide), etc. can be used. On the other hand, for the light source, various light emission diodes (LED) may be employed, and concretely, light sources using indium gallium nitride (InGaN), diamond (ultraviolet), gallium nitride (GaN)/aluminum gallium nitride (AlGaN) (ultraviolet, blue), zinc selenide (blue), or zinc oxide (near-ultraviolet, purple, blue) can be used. Then, in the structure of the present apparatus, as described above, the "heat exchange device" is provided. For the heat exchange device, an arbitrary form may be employed as long as the waste heat of the light source can be conducted to the water in the container portion. In one manner, as illustrated in the column of the embodiment later, the light source may be provided with a structure which achieves the function of a heat exchanger conducting the waste heat discharged from the light source to liquid, and in that structure of the heat exchanger, there may be installed a structure of circulating the water in the container portion. Moreover, alternatively, the light source, waterproofed, may be contacted to or immersed in the water in the container portion so that the waste heat of the light source may be conducted to the water.

In the structure of the above-mentioned present embodiment, in the apparatus that produces hydrogen gas by irradiating light to photocatalyst in contact with water to cause the decomposition reaction of water, there is provided a structure which warms the water by the waste heat of the light source. According to this structure, in a case of miniaturizing the hydrogen gas producing apparatus by increasing the density of the light irradiated to the photocatalyst per unit quantity to decrease the space which photocatalyst occupies, the decrease in the production efficiency of hydrogen gas due to the increasing of the density of the light irradiated to the photocatalyst can be compensated by warming the water which is the reactant. In this structure, moreover, because the warming of the water is achieved using the waste heat of the light source, there is no need to separately prepare a heater, etc. for warming the water, and thus, it is not necessary to supply energy separately for warming the water, so that the improvement in the efficiency of energy required for production of hydrogen gas will be attained. Namely, in accordance with the structure of the above-mentioned present apparatus, the apparatus can be miniaturized while the decrease in the efficiency of hydrogen gas production can be suppressed, and also, the improvement of the energy efficiency can be achieved. In this regard, as explained also in the column of the embodiment later, since the photocatalyst efficiency indicating the efficiency of hydrogen gas production (the ratio of the amount of production of hydrogen gas per photon quantity which enters into the photocatalyst) increases as the density of the irradiated light (irradiated light intensity) becomes lower, in order to achieve a desired photocatalyst efficiency, the density of the light irradiated to the photocatalyst member may be adjusted to be at or lower than a density which gives the photocatalyst efficiency at more than a predetermined value which may be chosen arbitrarily. Here, what is important is that, in the present apparatus, since the photocatalyst efficiency is raised by warming the water, it is possible to increase the density of the irradiated light for achieving a certain efficiency of hydrogen gas production, and corresponding to this, the miniaturization of the apparatus can be achieved without dropping the efficiency of hydrogen gas production.

In the structure of the above-mentioned present apparatus, since the temperature of the water in the container portion is higher than the surrounding normal temperature owing to its warming, heat dissipation from the water in the container portion to the outside of the container portion easily occurs without anything to cover it. Then, in order to prevent the heat dissipation from the warmed water, suppress the decrease in the photocatalyst efficiency and make the waste heat of the light source used more effectively, the container portion may have a heat insulation mechanism for suppressing the heat dissipation from the water to the outside of the container portion. For instance, a heat insulation structure may be provided by making the container portion of material with high insulation efficiency or covering the container portion with thermal insulation material.

Further, in the structure of the above-mentioned present apparatus, in order to make the light emitted from the light source be effectively absorbed into the photocatalyst and contribute to the decomposition reaction of water, it is preferable that the apparatus is designed so that the light emitted from the light source will be confined in the container portion. For this, in one manner, the container portion may have a light reflecting mechanism for confining the light emitted from the light source in the container portion. For instance, the light reflecting mechanism is formed by covering the inside of the container portion with reflective mirrors or by placing a reflective mirror adjacent the photocatalyst member.

Furthermore, in the structure of the above-mentioned present apparatus, the photocatalyst member may be a member in which photocatalyst is made in a layered form such that the photocatalyst layer is formed to have a thickness at which not all the light is absorbed in the photocatalyst when the light enters into the photocatalyst layer for the first time, and thereby the light which has penetrated the photocatalyst member once will be irradiated to the photocatalyst member again, owing that the light is confined in the container portion. In the photocatalyst, in order that the excited electrons generated by the irradiated light as much as possible can reduce the hydrogen atoms of water to contribute to the generating of hydrogen gas before the recombination to positive holes, it is preferable that the water can reach easily to the photocatalyst which absorbed light. Thus, as noted above, in the case that the photocatalyst layer is formed to have a thickness at which not all the light is absorbed in the photocatalyst when the light enters into the photocatalyst layer for the first time, the amount of the light absorbed in a region in the photocatalyst layer, distant from its surface, to which the water cannot easily reach in the photocatalyst, is decreased, and on the other hand, the light which has penetrated the photocatalyst member without being absorbed therein is irradiated to the photocatalyst member again because of the structure of confining the light in the container portion, and then absorbed in the photocatalyst to generate excited electrons so that it will contribute to generating hydrogen gas, and therefore, after all, the much more light can be absorbed into the photocatalyst in its region near its surface where the water reaches easily, contributing the generation of hydrogen gas, and accordingly, it is expected that the more amount of hydrogen gas can be produced.

In the above-mentioned present apparatus, concretely, the photocatalyst member may be a plate member on which photocatalyst is fixed in a layer form in the surface direction. Then, in one manner, the photocatalyst member may be constructed by arranging plural plate members as above to be inclined such that their surfaces are mutually faced while being closer to each other as those are away from the light source, and it is preferable that the incident angle of the light emitted from the light source to the respective surfaces of the plate members is larger than 0°. According to this structure, after the light emitted from the light source strikes upon one in the plural members, the light which reflected from that will strike upon the opposite member, and thereby it becomes possible to make the more amount of the light be absorbed into the photocatalyst and contribute to the generation of hydrogen gas. In this regard, the reason that the incident angle of the light is made larger than 0° is to prevent the reflecting ray of the light from returning toward the light source without hitting on any other faced members. Further, in the structure that the light advances between the plurality of mutually faced plate members while reflecting thereon as noted above, since the number of times of reflection of the light increases and the density of the light becomes higher as the regions of the members are farther from the light source, the photocatalyst layers of the photocatalyst plate members may be formed such that, as the region of the layer is farther from the light source, their thicknesses increase, and thereby, in the photocatalyst member, together with the increasing of the absorbed amount of the light by the photocatalyst, the amount of the photocatalyst may be adjusted corresponding to the density of the light in order for the photocatalyst amount to be distributed efficiently (the optimization of the photocatalyst amount). In this connection, the photocatalyst member in which plural plate members as described above are arranged may be designed so as to satisfy a condition that the light emitted from the light source reflects on the plate member twice or more.

In the above-mentioned present apparatus, the light source may be designed to be operated with electric power obtained by solar power generation to emit the light irradiated to the photocatalyst member while the waste heat during its operation is conducted to the water by the heat exchange device. According to this, the production of hydrogen gas will be achieved by renewable energy. Further, in accordance with the operating of the light source with the electric power obtained from the sunlight instead of the irradiating of the sunlight itself to the photocatalyst member, it becomes possible to supply light energy to the photocatalyst member while condensing the low solar energy per unit area, achieving the miniaturization of the apparatus.

By the way, when the light source is operated with electric power, it is preferable that the light emission efficiency of the light source is maximized. Thus, in a case that the light source is operated with the electric power obtained by the solar power generation, the rated output of the light source may be adjusted so that the light emission efficiency of the light source will be maximized when current is supplied to the light source at the rated current value of the solar power generation. Thereby, the solar energy can be more effectively used for the production of hydrogen gas. Furthermore, in the case of the solar power generation, its output is changed by the sunshine condition, and the available current is changeable every moment. In that case, the efficiency of the energy used in the production of hydrogen gas becomes better when the light source is operated at every moment so that its light emission efficiency will be maximized. In this respect, plural LEDs may be employed for the light source, and in that case, since the light emission efficiency of each LED changes according to the current supplied thereto, the light source may be designed such that the number of LEDs being operated in the plural LEDs is changed in accordance with the output current of the solar power generation in order to maximize the light emission efficiency of the light source. Then, it is expected that solar energy can be more effectively converted into the light from the light source and used for production of hydrogen gas.

Thus, according to the above-mentioned present embodiment, in the technique of producing hydrogen gas by the decomposition reaction of water using photocatalyst, based upon the knowledge that, although the photocatalyst efficiency would decrease when the density of the irradiated light becomes higher, the decrease in the photocatalyst efficiency can be compensated by raising the temperature of water which is the reactant, a hydrogen gas producing apparatus using photocatalyst is equipped with a heat exchange device which warms the water by the waste heat of a light source, and thereby, the decrease in the photocatalyst efficiency due to the increase of the density of the irradiated light is compensated through the warming of the water with the waste heat of the light source, and accordingly, there is provided a structure enabling the achievement of the miniaturization of the apparatus while suppressing the decrease in the efficiency of hydrogen gas production as low as possible together with attaining the increase in the energy efficiency. Furthermore, especially, according to the structure of warming water by the waste heat of the light source, the water temperature can be surely raised rather than in a case where the water is warmed solely by the radiant heat of the light source, and thereby the suppression of the decrease in the photocatalyst efficiency is more expected. Also, in the case of the manner in which the light source of the present apparatus is operated with electric power of the solar energy origin, it becomes possible to obtain hydrogen energy efficiently without emitting carbon dioxide.

Other purposes and advantages of the present embodiments will become clear by explanations of the following preferable embodiments.

DETAILED DESCRIPTIONS OF EMBODIMENTS

Basic Structure of Hydrogen Gas Producing Apparatus

Figure 1:
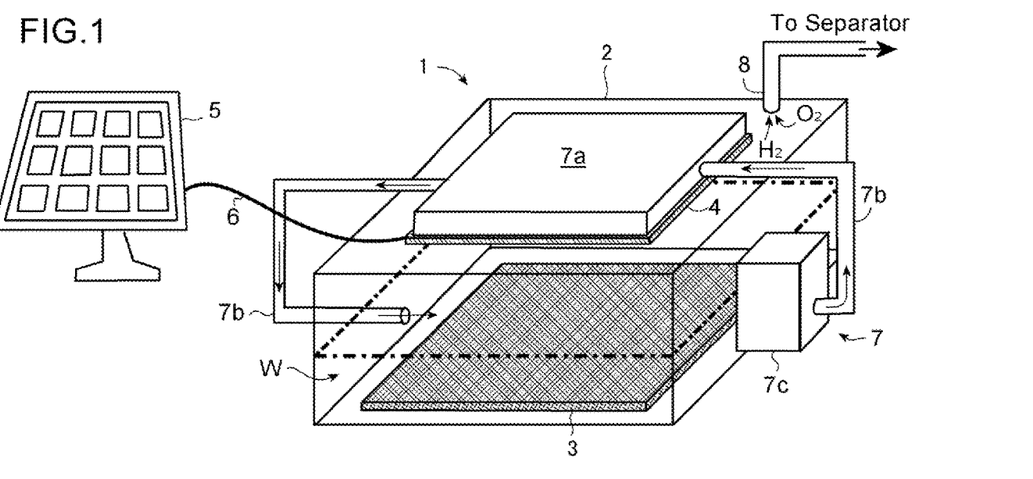
FIG. 1 is a schematic drawing of one embodiment of a hydrogen gas producing apparatus according to the present embodiment.

Referring to FIG. 1, the hydrogen gas producing apparatus 1 of this embodiment, in its basic structure, has a container portion 2, having an arbitrary form, which receives water (liquid) W; a photocatalyst member 3 which carries photocatalyst and is contacted to or immersed in the water W in the container portion 2; a light source device 4 which emits light to be irradiated to the photocatalyst member 3; a heat exchange device 7 for warming the water W stored in the container portion 2 by the waste heat of the light source device 4; and a gas pipe 8 which sends generated hydrogen gas and oxygen gas to a separator.

Figure 2:
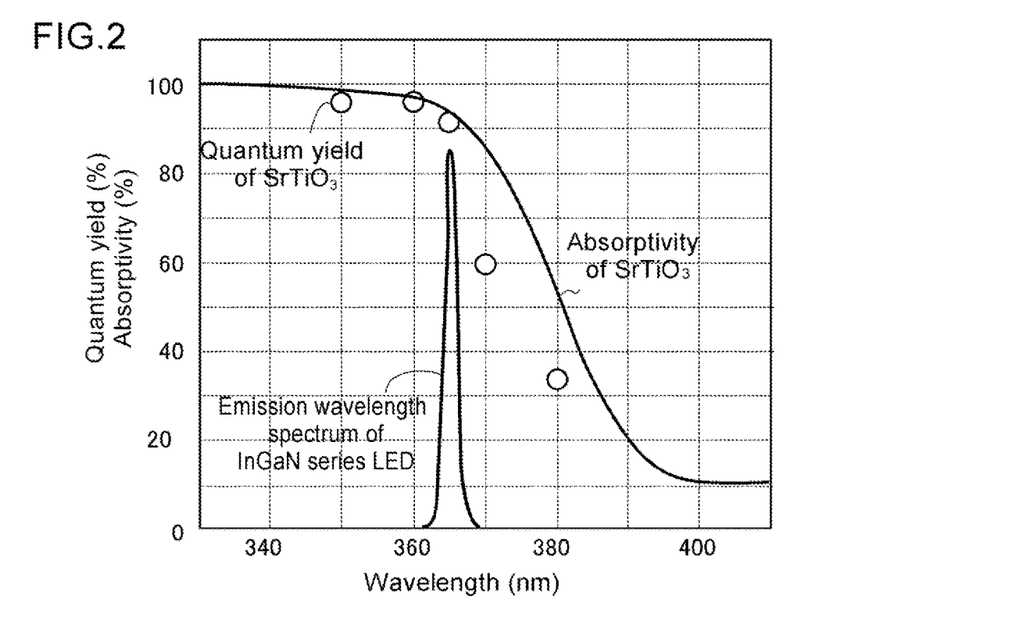
FIG. 2 is a drawing showing the examples of the wavelength characteristics of absorptivity and quantum yield of a typical photocatalyst ($SrTiO_3$) and the emission wavelength characteristic of a light source (InGaN series LED), used for the hydrogen gas producing apparatus according to the present embodiment. The data were measured by the inventors of the present embodiment.

In the structure of this hydrogen gas producing apparatus 1, the photocatalyst member 3 is a member carrying photocatalyst material which, when irradiated with light, can absorb photons, generate excited electrons and positive holes, cause the decomposition reaction of water where the water is reduced, and generate hydrogen gas, and the member may be formed of the photocatalyst material itself, or be prepared by fixing photocatalyst material on an arbitrary board or substrate. The photocatalyst member 3 may be typically formed in a plate form as illustrated, but not limited thereto if the photocatalyst material can contact to the water W. For instance, in one manner, the photocatalyst member 3 may be formed by placing the powder of a photocatalyst material over a glass substrate or a ceramic board, and heating and sintering it. Or, a substrate formed by hardening photocatalyst material in a plate form may be employed as the photocatalyst member 3. For the photocatalyst material used in this embodiment, as noted above, any material which can generate hydrogen gas from water through the irradiation of light, used in this field, may be used, and concretely, for example, $SrTiO_3$ (strontium titanate), $Ga_2O_3$ (gallium oxide), GaN (gallium nitride), $NaTaO_3$ (sodium tantalate), $TiO_2$ (titanium oxide), etc. can be used. As shown in FIG. 2, the photocatalyst material typically exhibits a wavelength characteristic that, when the wavelength of the irradiated light is changed shorter from a long wavelength, its absorptivity and quantum yield increase rapidly near a certain wavelength (The generated amounts of excited electrons and positive holes because of the absorption of photons increase in the wavelength band in which the absorptivity and quantum yield increase.).

The light source device 4 may be an arbitrary light source which emits the light of a wavelength which is absorbed by the photocatalyst material on the above-mentioned photocatalyst member 3 to generate excited electrons and positive holes. In this respect, more in detail, as in FIG. 2 noted above, the absorptivity and quantum yield of the photocatalyst material have wavelength characteristics which increase when the light in the wavelength band shorter than a certain wavelength is irradiated, and therefore, for the light source device 4, a light emitting element or a light-emitting object which generates the light in the wavelength band where the absorptivity and quantum yield of the photocatalyst material of the photocatalyst member 3 increase is chosen preferably. Concretely, for the light emitting element or light-emitting object of the light source, various light emission diodes (LED) using indium gallium nitride (InGaN), diamond (ultraviolet), gallium nitride (GaN)/aluminum gallium nitride (AlGaN) (ultraviolet, blue), zinc selenide (blue), zinc oxide (near-ultraviolet, purple, blue), etc. may be employed. For instance, in a case that $SrTiO_3$ is used as photocatalyst material of FIG. 2, since its absorptivity and quantum yield will increase when the wavelength of the irradiated light is less than 380 nm, an LED of InGaN series which has a peak of an emission wavelength in 360-370 nm can advantageously be used for the light-emitting object of the light source device 4.

Then, in the hydrogen gas producing apparatus 1 of this embodiment, the heat exchange device 7 for warming the water W in contact with the photocatalyst member 3 in the container portion 2 with the waste heat of the light source device 4 as noted above is provided, and thereby, both the miniaturization of the apparatus and improvement of the efficiency of hydrogen gas production are achieved while suppressing the loss of energy as low as possible.

In this respect as noted in the column of "SUMMARY", according to research of the inventors of the present embodiment, it has been found out through the experiment described below that the efficiency of the hydrogen gas production by photocatalyst decreases when the density of the light (light intensity) irradiated to the photocatalyst is increased while the same efficiency raises when the temperature of the water which is the reactant is raised.

In the experiment, a photocatalyst member prepared by spreading and sintering 100 mg $SrTiO_3$ (strontium titanate) on a glass plate was immersed in 200 ml of water put in a container made of silica glass, and then irradiated with 365 nm light at various light intensities by LED (maximum output 0.691 W) of a spot type while adjusting water temperature to various values with a heater, and thereby, hydrogen gas generated by the induced decomposition reaction of water was collected, and the amount of the gas was measured. The irradiated area of the light was 2 $cm^2$. The output of the LED (the irradiated light intensity) was adjusted while measuring it with a power meter (Ophir Japan 50(150)A-BB26). The amount of the irradiated light to the photocatalyst (incident light amount) was computed by the following:

Incident light amount (mmol·cm$^{-2}$·hr$^{-1}$)=$P \times \lambda \times 3600/(A \cdot h \cdot c)$ Here, P is an LED output (W·cm$^{-2}$); $\lambda$, wavelength=365 (nm); A, Avogadro's number (mol$^{-1}$); h, Planck constant (J·s); and c, the velocity of light (m·s$^{-1}$). And, the efficiency of hydrogen gas production (photocatalyst efficiency) was computed by the following;

Photocatalyst efficiency (%)=[Generated amount of hydrogen gas $H_2 \times 2$]/[Incident light amount]

Here, the unit of the generated amount of hydrogen gas is mmol·cm$^{-2}$·hr$^{-1}$ (The amount of reduction of hydrogen ions is twice of the hydrogen gas.).

Figure 3A:
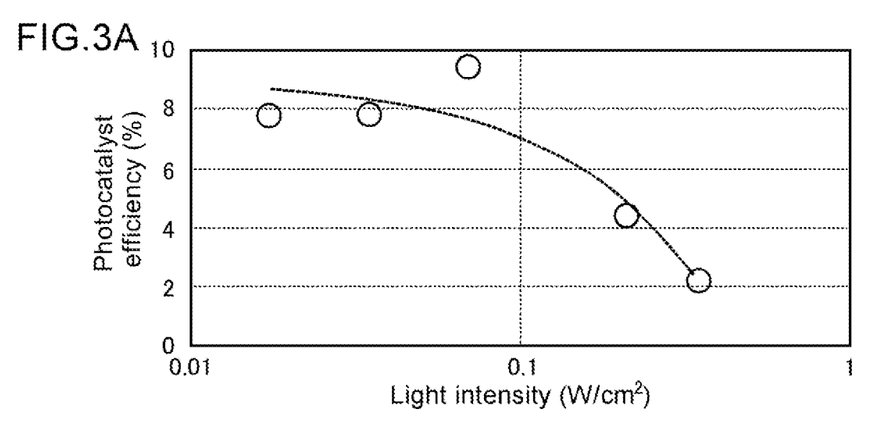
FIG. 3A is a graph chart showing the change of the photocatalyst efficiency against the density of the light (light intensity) irradiated to photocatalyst.

In the results, first, referring to FIG. 3A, when the LED output was changed to be at 5%, 10%, 20%, 60%, and 100% of its maximum output under the condition of the water temperature of 25° C. (room temperature), the photocatalyst efficiency fell with the increase of the LED output, i.e., the density of the irradiated light. This is considered because, even if the densities of excited electrons and positive holes generated in the photocatalyst are increased by the increase of the light intensity, the speed of the decomposition reaction of water with the excited electrons and positive holes is slow, and thus, the excited electrons and positive holes disappear by their recombination before these react to water, respectively. That is, it shows that the ratio of photon energy which contributes to the generating of hydrogen gas decreases when the density of the light irradiated to the photocatalyst is increased. On the other hand, referring to FIG. 3B, when the water temperature was raised to 30° C., 40° C., 50° C., and 60° C. while maintaining the LED output at its maximum output, the photocatalyst efficiency increased with the rise of the water temperature. This is considered because the speed of the reaction of the electrons and water by the photocatalyst is increased by the heating.

Figure 3B:
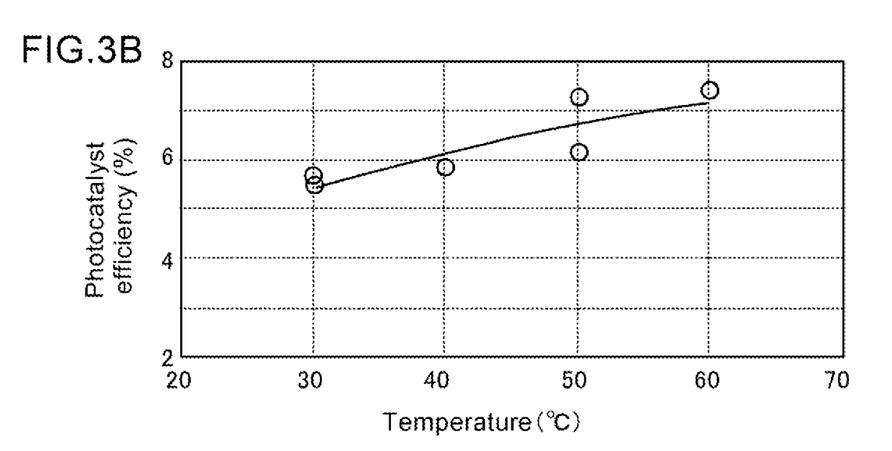
FIG. 3B is a graph chart showing the change of the photocatalyst efficiency against the temperature in water contacted to photocatalyst, obtained through experiments. The data were measured by the inventors of the present embodiment.

Thus, considering the results in FIGS. 3A and 3B together, it has been shown for the hydrogen gas producing apparatus that, in a case that the density of the light irradiated to photocatalyst is increased so that the space occupied by the photocatalyst will be made smaller for miniaturizing the apparatus, if the water temperature is a normal temperature, the efficiency of hydrogen gas production, namely, the produced amount of hydrogen gas per photon energy supplied decreases and thus the energy efficiency decreases, and on the other hand, if the temperature of the water, which is the reactant, is raised, it is expected that the decrease in the efficiency of hydrogen gas production due to the increase in the irradiated light density can be compensated or the efficiency can be maintained. Moreover, with respect to the warming of water, normally, a light source device emitting the light irradiated to photocatalyst discharges waste heat with the light, and if the waste heat of the light source device can be used for the warming of water, it becomes unnecessary to prepare a separate heater so that no energy will be needed to be supplied to a heater, and thus, the saving of energy for hydrogen gas production is attained. From the above knowledge, a heat exchange device 7 as described above is installed in the hydrogen gas producing apparatus 1.

Figure 4:
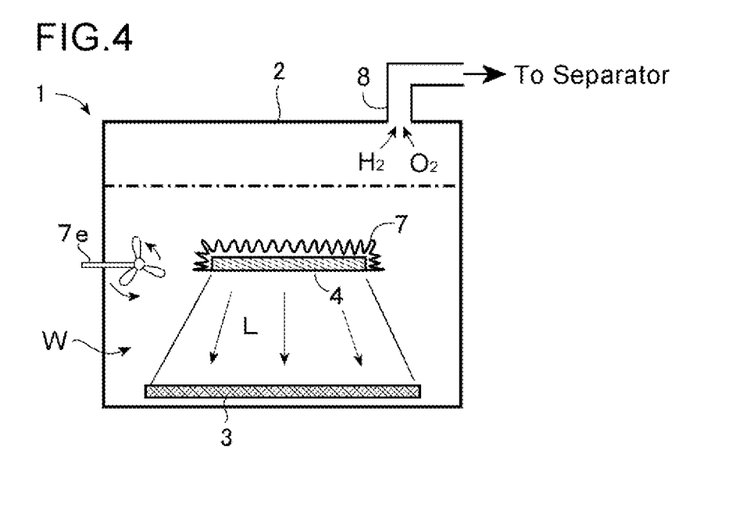
FIG. 4 is a schematic drawing of another embodiment of the hydrogen gas producing apparatus according to the present embodiment.

The heat exchange device 7 may be realized in an arbitrary from as long as it can achieve the warming of water in the container portion 2 with the waste heat of the light source device 4. In one manner, as schematically drawn in FIG. 1, a heat exchanger 7a is installed adjacent the light source device 4, and then, the water may be warmed by pressure-feeding and circulating the water in the container portion 2 through a water pipe 7b to the heat exchanger 7 with a pump 7c. Furthermore, in another manner, as schematically drawn in FIG. 4, the light source device 4 equipped with the heat exchanger 7 and waterproofed is immersed in the water W in the container portion 2, and thereby, the water W may be warmed with the waste heat of the light source device 4. In that case, for example, a stirrer 7e for generating the convection in the water W in the container portion 2 may be provided. Or, the light source device 4 may be placed on the bottom of the container portion 2 while the photocatalyst member 3 may be placed on the upper part of the container portion 2, and thereby, the water warmed by the light source device 4 rises up toward the upper part of the container portion 2. According to those structures using a heat exchanger, it is advantageous in that the warming of water is achieved more promptly than the case that only the radiant heat from a light source is used (It is advantageous in that the warming of water is achieved promptly also when the electric power supplied to the light source device 4 is changed (such as when the electric power is sent from the power production source with renewable energy).).

In the above-mentioned structure, the density of the light (light intensity) irradiated on the photocatalyst member 3 may be chosen so that the photocatalyst efficiency may become comparatively high, as shown in FIG. 3A. For instance, when an area which receives the light irradiated to the photocatalyst member 3 is A cm², the optical power $P_L$(W) from the light source device 4 may be adjusted to be 0.1×A (W) so that the light intensity will be at or below 0.1 W/cm², giving a high photocatalyst efficiency. What should be understood is that the decrease in the photocatalyst efficiency due to the raising of the light intensity can be compensated by the rise of the water temperature.

The light source device 4 of the apparatus 1 of the above-mentioned this embodiment operates with electric power, which may be preferably given from the energy of the sunlight origin, generated by a solar panel, or other renewable energy. For that, the light source device 4 may be designed so as to receive the supply of electric power from a power production source with renewable energy, such as a solar panel 5, through a power line 6.

In the operation of the hydrogen gas producing apparatus 1 of the present embodiment, the light source device 4 is supplied with electric power from the power production source of a solar panel 5, etc., and emits light, and the light is irradiated to the photocatalyst material on the photocatalyst member 3 in the container portion 2. Further, the water W in the container portion 2 is warmed by the heat exchange device 7 with the waste heat of the light source device 4. Then, in the photocatalyst material, the light is absorbed and excited electrons and positive holes are generated, and, by the excited electrons, hydrogen of the water is reduced to form hydrogen gas while, by the positive holes, oxygen of the water is oxidized to form oxygen gas. After that, the generated hydrogen gas and oxygen gas pass through the gas pipe 8, and are sent to a separating equipment (not shown), where the hydrogen gas is separated and collected. The separating equipment may be an arbitrary separating equipment, using, for instance, hydrogen separating membrane used in this field.

Improvement of Structure of Hydrogen Gas Producing Apparatus

The structure of the hydrogen gas producing apparatus of this embodiment may be variously improved so that the light and waste heat, emitted from the light source device 4, may contribute to the production of hydrogen gas more effectively, as illustrated below.

(a) Structure Improving the Utilization Efficiency of the Light from the Light Source Device 4

In order to make it possible to use the light from the light source device 4 more effectively in the production of hydrogen gas, in one manner, there may be provided a structure for confining the light L from the light source device 4 in the container portion 2. For instance, a light reflecting mechanism, such as a reflective mirror, may be prepared adjacent an inner wall of the container portion 2 or the photocatalyst member 3. In that case, the light, which hits upon the inner wall of the container portion 2 directly from the light source device 4 is expected to reflect there and enter into the photocatalyst member 3. Also, as schematically drawn in FIG. 5A, it may be designed that a part of the light L irradiated to the photocatalyst member 3, penetrating through the photocatalyst member 3, is reflected by the reflective mirror 9 and the reflected light Lr enters into the photocatalyst member 3 again. In this respect, in order to cause the decomposition reaction of water, the excited electron generated by the light irradiated on the photocatalyst member 3 is needed to contact a water molecule on the surface of the photocatalyst member 3 (excited electrons generated in the depth of the photocatalyst member 3 recombines with positive holes without reacting to water molecules.). Thus, it is preferable that the entering photons as much as possible are absorbed on the surface of the photocatalyst member 3. Then, in this embodiment, in a case that the photocatalyst member 3 is a member in which photocatalyst material is formed in a layer structure, it is preferable that the photocatalyst layer is formed at a thickness at which not all the light is absorbed in the photocatalyst when it enters the photocatalyst layer for the first time. In this case, as in FIG. 5A, the light L which has penetrated through the photocatalyst member 3 and reflected on the reflective mirror 9 will be irradiated on the surface on the back side of the photocatalyst member 3, and thereby, more photons are absorbed on or near the surface of the photocatalyst member 3 (The number of photons absorbed in the depths of the photocatalyst member 3 decreases.) so that it becomes possible to make much more photon energy contribute to the generating of hydrogen gas.

Figures 5A, 5B, 5C, 5D:
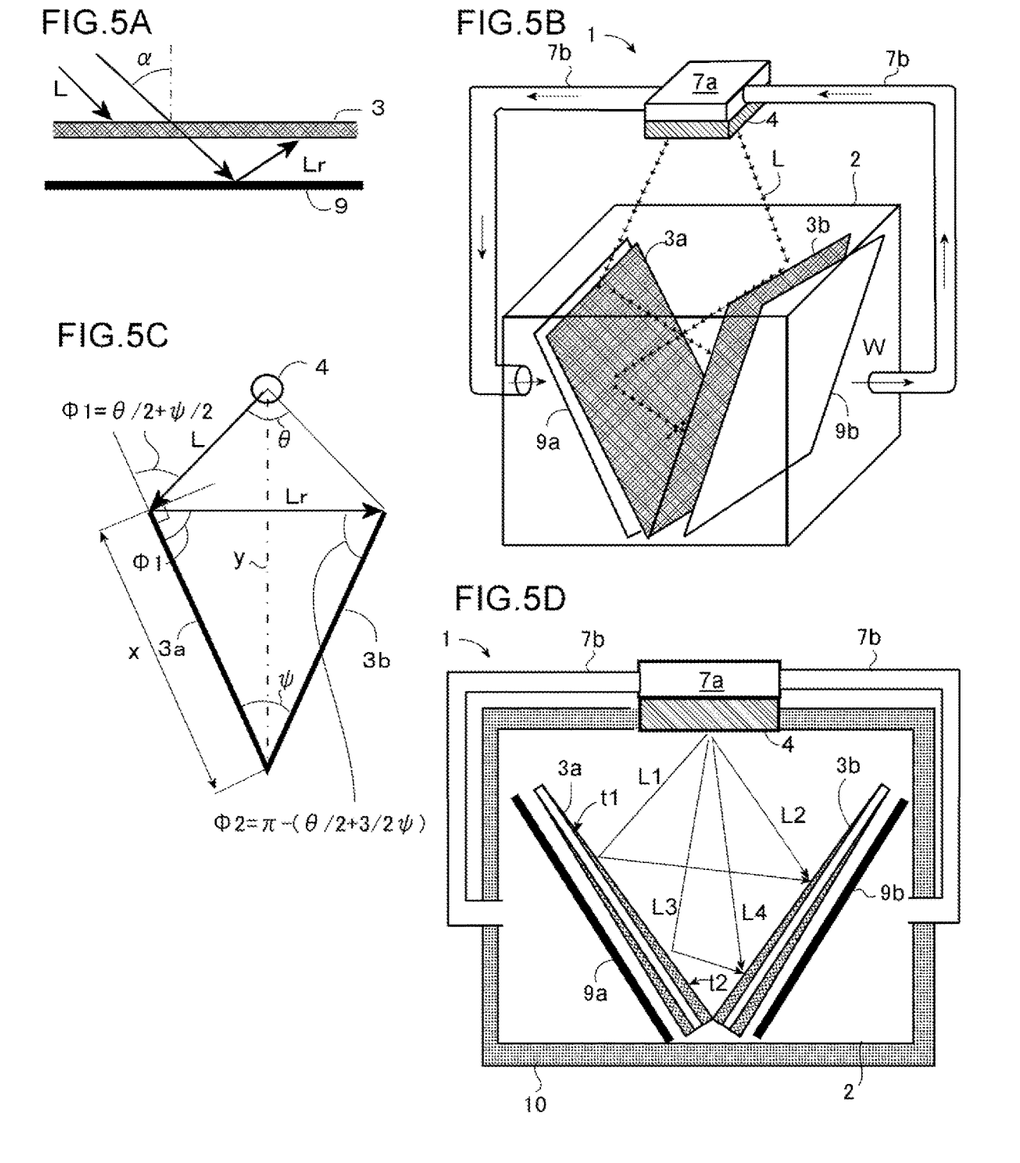
FIG. 5A is a schematic drawing of a photocatalyst layer of a photocatalyst member in the hydrogen gas producing apparatus according to the present embodiment, showing a situation that irradiated light which penetrates a photocatalyst layer once is reflected by a reflector and irradiated again to the photocatalyst layer.
FIG. 5B is a schematic drawing of another embodiment of the hydrogen gas producing apparatus according to the present embodiment, showing an example that plural photocatalyst members are arranged in a V-shape form.
FIG. 5C is a drawing explaining the relation between the directional angle θ of the range of the rays of the light emitted from the light source in FIG. 5A, and the included angle ψ of the photocatalyst members arranged in the V-shape form.
FIG. 5D is a schematic drawing of the embodiment where more advantageous characteristic structure is added to the structure of FIG. 5A.

Moreover, in the hydrogen gas producing apparatus 1 of this embodiment, as schematically drawn in FIG. 5B, the photocatalyst member 3 may be formed in a structure that two or more plate members 3a and 3b are arranged to form a V-shape such that the respective surfaces of the plate members are mutually faced and become closer as they are away from the light source. According to this structure, in the light L irradiated on one of the plate members 3a and 3b, a part of the light, reflected without being absorbed by the photocatalyst material, is irradiated on the other of the plate members 3a and 3b and thus, there is the opportunity that the reflected light can be absorbed in the photocatalyst material, and thereby, it becomes possible to make much more photon energy contribute to the generating of hydrogen gas. In that case, it is preferable that, in order for the light L emitted from the light source device 4 and reflected on one of the plate members 3a and 3b to go to the other of the plate members 3a and 3b instead of returning toward the light source device 4, the incident angle ($\alpha$) of the light L emitted from the light source device 4 to each surface of the plate members 3a and 3b is larger than 0° (refer to FIG. 5A). In this regard, with reference to FIG. 5C, as noted above, in a structure that the plural photocatalyst members 3a and 3b are arranged in the V-shape form at the included angle $\psi$, when the plate length x of the photocatalyst members 3a and 3b and the distance y from the point of the included angle of the members formed in the V-shape to the light source device 4 satisfies $x \leq y \cdot \sin(\psi/2)$, if the ray of the light L emitted from the light source device 4 at a directional angle $\theta$ reaches one of the photocatalyst members 3a and 3b and the ray of the light Lr, reflected thereon, reaches also the other of the photocatalyst members 3a and 3b, the condition of $\phi 1 \leq \phi 2$ is fulfilled between the angle $\phi 1 = \theta/2 + \psi/2$, defined by the ray of the light L and one surface of the photocatalyst members 3a and 3b, and the angle $\phi 2 = 180° - (\theta/2 + 3/2\psi)$, defined by the ray of the reflected light Lr and the other surface of the photocatalyst members 3a and 3b. Therefore, the included angle $\psi$ of the plural photocatalyst members 3a and 3b, and the directional angle $\theta$ of the light source device 4 may be adjusted to satisfy the condition:

$$\psi \leq 90° - \theta/2.$$

Moreover, in order for the light having penetrated through the plural plate members 3a and 3b to enter into the plate members 3a and 3b again, there may be provided reflective mirrors 9a and 9b on the respective sides of the plural plate members 3a and 3b opposite to the light source device 4.

Furthermore, as noted above, in the case that the photocatalyst member 3 is formed by the plural plate members 3a and 3b arranged in a V-shape, as schematically drawn in FIG. 5D, the layer of the photocatalyst of the photocatalyst members 3a and 3b may be formed such that its thickness (t1, t2) is increased as it is farther away from the light source device 4 (t1<t2). As illustrated, in a structure that the rays of the light (L1-L4) from the light source device 4 advance while being reflected between the photocatalyst members 3a and 3b arranged in the V-shape, the amount of the reaching light increases and the density of light becomes higher as their positions are farther away from the light source device 4. Thus, as noted above, the thickness (t1, t2) of the photocatalyst layer may be increased and the amount of the photocatalyst material may be increased as it is farther away from the light source device 4, so that the absorbed amount of the light by the photocatalyst material will be increased. Thereby, in the photocatalyst member 3, the amount of photocatalyst is lessened in a place where the light intensity is low while the amount of photocatalyst is increased in a place where the light intensity is high, and thereby it can be avoided to use the photocatalyst material in vain, and it can be achieved to efficiently distribute the amount of photocatalyst.

Thus, in accordance with the above-mentioned series of structures, the light emitted from the light source device 4 will be absorbed much more by the photocatalyst material, while the loss of energy supplied in the form of the light from the light source device 4 will be suppressed.

(b) Structure Suppressing the Loss of Waste Heat from the Light Source Device 4

As noted, in the hydrogen gas producing apparatus 1 of this embodiment, the water, which is the reactant, is warmed with the waste heat of the light source device 4. In this structure, when the apparatus 1 is installed under a normal temperature (room temperature), heat is radiated from the container portion 2 while the temperature of the warmed water falls, and thereby, the energy obtained from the waste heat of the light source device 4 becomes in vain. Then, in the container portion 2, there may be provided a heat insulation mechanism 10 by covering its circumference with thermal insulating material, etc. for suppressing heat dissipation so that the loss of the waste heat from the light source device 4 can be suppressed.

Figure 6:
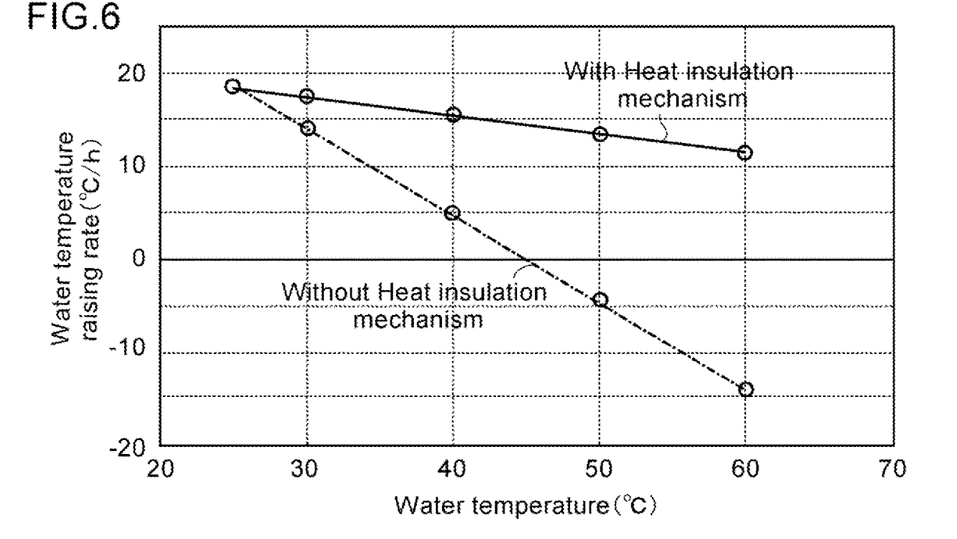
FIG. 6 is graph charts of the change of the raising rates of the water temperature to itself in the structure of warming water with the waste heat of a light source by a heat exchange device as shown in FIGS. 1, 5A, and 5C, obtained by the simulation, wherein the cases where the container portion is equipped with the heat insulation mechanism and without it are shown. The data were obtained through simulations by the inventors of the present embodiment.

In this respect, that the water temperature providing a high photocatalyst efficiency can be achieved and maintained by warming the water with the waste heat of the light source device 4 and providing the heat insulation mechanism 10 in the container portion 2 has been confirmed in the following simulation by the inventors of the present embodiment. In the simulation, there was assumed a structure, as in FIG. 1, that the light source device 4 generating 11.05 W of calorific power (the optical power 5 W, the light-emitting efficiency 31.4%) was equipped in the container portion 2 into which 500 ml of water had been poured (made of glass, cylindrical, 40 mm in radius and 40 mm in height) while the water from the container portion 2 was circulated in the heat exchanger adjacent the light source device 4 through a tube (6 mm in diameter, 1 m in length). Then, in this structure, the water temperature rising rates (° C./hr) at various water temperatures when the water was assumed to be warmed with the waste heat of the light source device 4 were computed under a normal temperature (about 25° C.) in the cases that the container portion 2 was covered with and without thermal insulation material (thermal conductivity 0.03 W/mK and 10 mm in thickness), respectively. FIG. 6 shows the water temperature rising rate (° C./hr) at each water temperature. As illustrated, in the case that the container portion 2 was not covered with thermal insulation material, when the water temperature exceeded 45° C., the temperature fell (the water temperature rising rate was negative) even in the warming of the water with the waste heat of the light source device 4, and thus, the heat dissipating amount exceeded beyond the heating amount of the water. On the other hand, in the case that the container portion 2 was covered with thermal insulation material, the water temperature rising rate was always positive in the experimented temperature range, and thus, it was confirmed that the condition that the water was warmed was maintained. In particular, comparing with the result in FIG. 3B, the water temperature did not fall in the above-mentioned structure in the case that the water temperature was 50° C. or more at which a significant increase of the photocatalyst efficiency is obtained. Accordingly, it has been shown that, by providing the heat insulation mechanism 10 in the container portion 2, the water can be warmed with the waste heat of the light source device 4, and be effectively used in the production of hydrogen gas Output Control of the Light Source Device As already noted, in the hydrogen gas producing apparatus 1 of this embodiment, the electric power supplied to the light source device 4 may be of renewable energy origin, such as obtained by a solar panel 5. For the light irradiated on the photocatalyst, by using the light emitted from the light source device with the electric power converted from solar energy, instead of using the sunlight directly, the wavelength of the light can be converted into the wavelength band where the photocatalyst easily absorbs and also the density of the light can be condensed, and thereby the space occupied by the photocatalyst can be made small so that the miniaturization of hydrogen gas producing apparatus will be easy.

Figure 7A:
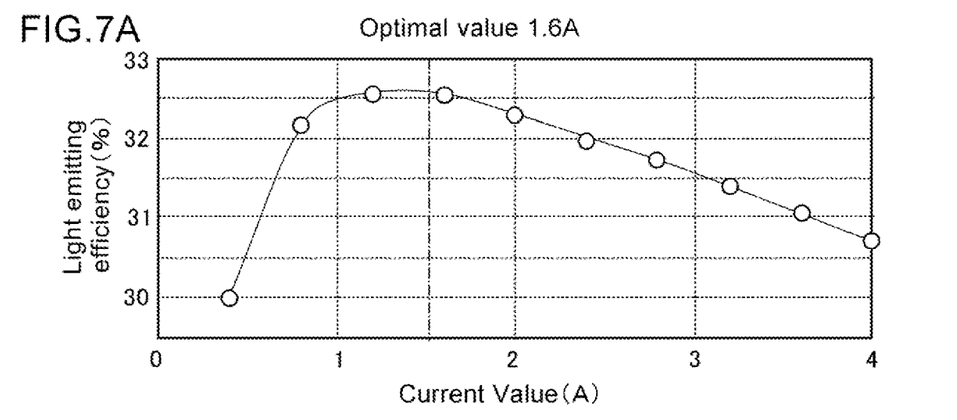
FIG. 7A is a graph chart showing the change of the light emission efficiency of a light source against the current supplied thereto, where the light source was formed by four LEDs being connected in parallel to an electric source, obtained by experiment.

By the way, in a case of obtaining the light irradiated to photocatalyst by supplying electric power to the light source device 4 to make a light emitting element or a light-emitting object emit the light, it has been found out that the light emitting efficiency of a light emitting element or a light-emitting object, such as LED, varies with the magnitude of the current supplied thereto. According to the experiments of the inventors of the present embodiment, when the light emitting efficiency (%) of four LEDs, each exhibiting 1 A of the rated current and 3.54 V of the rated voltage, connected in parallel, was measured, the light emitting efficiency became its maximum under the condition that the supplied current was a current (1.6 A) which was less than the rated current (4 A) as illustrated in FIG. 7A. Namely, this shows that, when the current, more than the current where the light emitting efficiency is its maximum, is supplied to the light emitting element or light-emitting object, the ratio of the energy which is not converted into the light would increase relatively, and thus the energy loss would increase. Then, in this embodiment, it is preferable that the current supplied to the light source device 4 is adjusted so that the light emitting efficiency of the light emitting element or light-emitting object will be its maximum. Or, in the current to be suppliable to the light source device 4, the magnitude of the current in the light emitting element or light-emitting object may be adjusted so as to make the light emitting efficiency its maximum. Concretely, the light emitting element or light-emitting object of normal power in which the current giving the maximum light emitting efficiency flows when the suppliable current is supplied to the light source device 4 may be chosen. Thus, for instance, in a case that the electric power source which supplies electric power to the light source device 4 is a solar panel, a light emitting element or a light-emitting object may be preferably chosen so that the current which gives the maximum light emitting efficiency will flow when the rated current value of the solar panel is supplied.

Figure 7B:
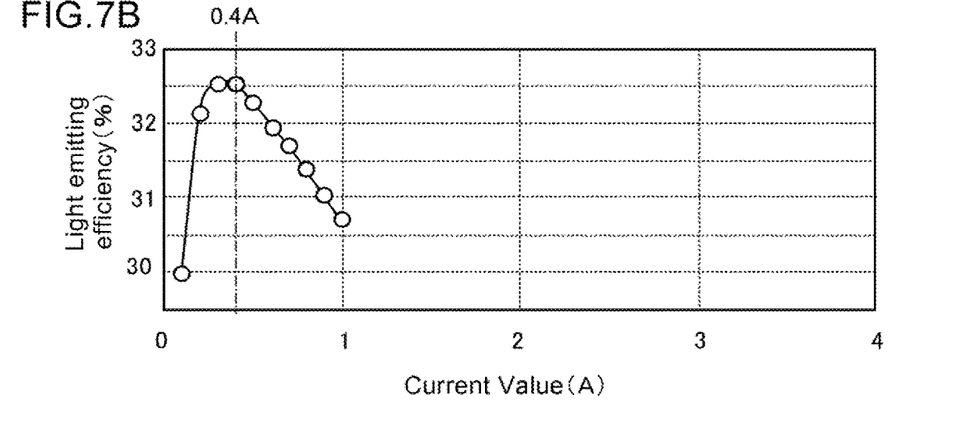
FIG. 7B is a graph chart showing the change of the light emission efficiency of a light source to the current supplied thereto, where the light source was formed by one LED being connected to an electric source. The data were obtained through experiments by the inventors of the present embodiment.
Figure 8A:
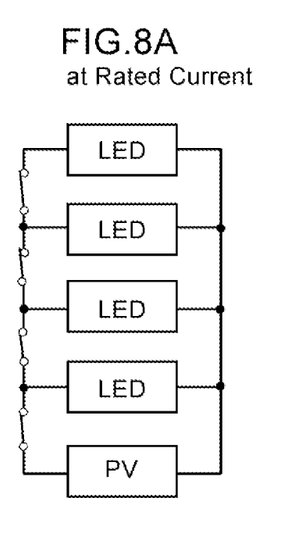
FIG. 8A-8C are drawings showing schematically circuit configurations of a light source in which the number of LEDs operated in accordance with the amount of generated current of a solar panel.
Figure 8B:
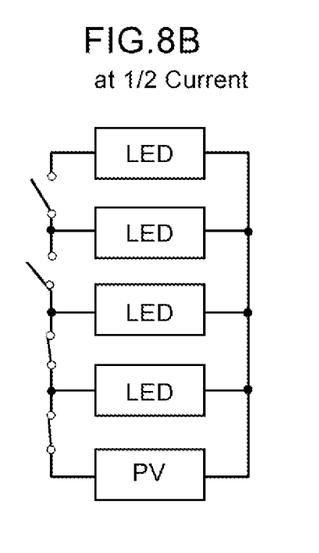
Figure 8C:
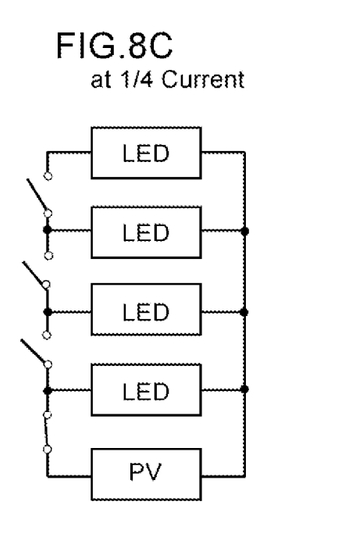

Moreover, in a case that a power production source with renewable energy, such as a solar panel, is used as an electric power source which supplies electric power to the light source device 4, the output of the power production source can be changed with its environmental conditions, such as the sunshine condition, and thus, the available current can vary every moment. In that case, if the light source device is operated so that its light emitting efficiency will be its maximum each moment, a good efficiency of the energy used for production of hydrogen gas will be obtained. As one way for this, in the light source device 4 of this embodiment, there may be employed a structure that two or more LEDs are connected in parallel for the light emitting elements or light-emitting objects, as drawn in FIGS. 8A to 8C. In this structure, the number of LEDs connected to the power production source is adjusted in accordance with the output of the power production source, and thereby, it is designed that, always, currents giving the maximum light emitting efficiency flow in the connected LEDs as much as possible. For instance, when the output of the power production source is its normal power, all the LEDs are connected to the power production source PV as shown in FIG. 8 (A), and when the output of the power production source is about a half of its normal power, a half of the LEDs are connected to the power production source PV as shown in FIG. 8B, and when the output of the power production source is about ¼ of its normal power as shown in FIG. 8C, ¼ of the LEDs is connected to the power production source PV. Thereby, it becomes possible to achieve the condition that the current giving the maximum light emitting efficiency flows in each LED connected to the power production source PV as illustrated in FIG. 7B. Namely, by adjusting the number of LEDs connected in accordance with the output of the power production source, the light emitting efficiency in each of LEDs supplied with current from the power production source becomes as close to its maximum as possible, so that the loss of the energy which does not contribute to the generating of the light will be suppressed.

Therefore, according to the hydrogen gas producing apparatus 1 of the present embodiment, in the structure of providing the light irradiated to photocatalyst by a light source device which operates with in the supply of electric power, the warming of the water, which is the reactant, with the waste heat of the light source device compensates the decrease in the production efficiency of hydrogen gas due to the increase of the density of the light irradiated to the photocatalyst from the light source device, and thus, in the miniaturization of the apparatus by increasing the amount of light irradiated to the photocatalyst per unit quantity, the decrease in the production efficiency of hydrogen gas can be suppressed, and thereby both the miniaturization and the increasing of the efficiency of the apparatus are achieved. Furthermore, according to the series of structures illustrated in FIG. 5, through making the photocatalyst absorb as much light irradiated from the light source device as possible and suppressing the loss of the waste heat of the light source device as low as possible, it becomes possible to make as much photon energy and thermal energy from the light source device as possible contribute to the production of hydrogen gas. Also, according to the structure as illustrated in relation to FIGS. 7 and 8, by maximizing the light emitting efficiency of the light source device as much as possible, it becomes possible to make as much energy supplied to the light source device as possible contribute to the production of hydrogen gas. Thus, according to the series of structures of the present embodiment, the further improvement of the energy efficiency in the production of hydrogen gas is expected.

Although the above explanation has been described with respect to embodiments of the present embodiment, it will be apparent for those skilled in the art that various modifications and changes are possible, and that the present embodiment is not limited to the above-illustrated embodiments and may be applied to various devices and apparatus without deviating from the concepts of the present embodiment.

The invention claimed is:

1. A hydrogen gas producing apparatus, comprising:
a container portion which receives water,
a photocatalyst member placed in the container portion to be immersed in the water therein, which member has photocatalyst which generates excited electrons and positive holes when it is irradiated with light, causes a decomposition reaction of the water which decomposes water into hydrogen and oxygen and generates hydrogen gas;
a light source emitting the light which is irradiated to the photocatalyst member and induces the decomposition reaction of the water; and
a heat exchange device which conducts waste heat of the light source to the water in the container portion;
wherein the water to be decomposed on the photocatalyst member in the container portion is warmed by the waste heat of the light source by the heat exchange device, and
wherein the photocatalyst member comprises plural plate members in which the photocatalyst is fixed in layer in a surface direction of each of the plate members, the plate members being arranged so that their respective surfaces are mutually faced and inclined to become closer to one another as those are farther away from the light source, and an incident angle of the light emitted from the light source to each surface of the plate members is larger than 0°.

2. The apparatus of claim 1, wherein the light source is operated with electric power obtained by solar power generation and emits the light irradiated to the photocatalyst member while waste heat in the operation of the light source is conducted to the water by the heat exchange device.

3. The apparatus of claim 1, wherein a density of the light irradiated to the photocatalyst member is adjusted at or lower than a density which gives a photocatalyst efficiency more than a predetermined value, which efficiency is a ratio of an amount of the generated hydrogen gas per photon quantity entering into the photocatalyst.

4. The apparatus of claim 1, wherein the apparatus is configured to confine the light emitted from the light source in the container portion.

5. The apparatus of claim 4, wherein the container portion has a light reflecting mechanism for confining the light emitted from the light source in the container portion.

6. The apparatus of claim 4, wherein the photocatalyst member is a member on which the photocatalyst is formed in layer, and the photocatalyst layer is formed in a thickness that not all the light is absorbed in the photocatalyst when the light enters into the photocatalyst layer for the first time, and the light which penetrated through the photocatalyst member is irradiated again to the photocatalyst member.

7. The apparatus of claim 1, wherein the container portion has a heat insulation mechanism which suppresses heat dissipation from the water to outside of the container portion.

8. The apparatus of claim 1, wherein the layer of the photocatalyst of the photocatalyst member is formed in a thickness which increases as it is farther away from the light source.

9. The apparatus of claim 1, wherein the photocatalyst member is configured to satisfy a condition that the light emitted from the light source reflects on the plate members twice or more.

10. The apparatus of claim 1, wherein an emission wavelength of the light source is selected to fall in a wavelength band in which a quantum yield of the photocatalyst exceeds beyond a predetermined threshold value.

11. A hydrogen gas producing apparatus, comprising:
a container portion which receives water,
a photocatalyst member placed in the container portion to be immersed in the water therein, which member has photocatalyst which generates excited electrons and positive holes when it is irradiated with light, causes a decomposition reaction of the water which decomposes water into hydrogen and oxygen and generates hydrogen gas;
a light source emitting the light which is irradiated to the photocatalyst member and induces the decomposition reaction of the water; and
a heat exchange device which conducts waste heat of the light source to the water in the container portion;
wherein the water to be decomposed on the photocatalyst member in the container portion is warmed by the waste heat of the light source by the heat exchange device,
wherein the light source is operated with electric power obtained by solar power generation and emits the light irradiated to the photocatalyst member while waste heat in the operation of the light source is conducted to the water by the heat exchange device, and
wherein a rated output of the light source is adjusted so that a light emitting efficiency of the light source will be maximized when a current is supplied to the light source at a rated current value of the solar power generation.

12. The apparatus of claim 11, wherein a density of the light irradiated to the photocatalyst member is adjusted at or lower than a density which gives a photocatalyst efficiency more than a predetermined value, which efficiency is a ratio of an amount of the generated hydrogen gas per photon quantity entering into the photocatalyst.

13. The apparatus of claim 11, wherein the apparatus is configured to confine the light emitted from the light source in the container portion.

14. The apparatus of claim 13, wherein the container portion has a light reflecting mechanism for confining the light emitted from the light source in the container portion.

15. The apparatus of claim 13, wherein the photocatalyst member is a member on which the photocatalyst is formed in layer, and the photocatalyst layer is formed in a thickness that not all the light is absorbed in the photocatalyst when the light enters into the photocatalyst layer for the first time, and the light which penetrated through the photocatalyst member is irradiated again to the photocatalyst member.

16. The apparatus of claim 11, wherein the container portion has a heat insulation mechanism which suppresses heat dissipation from the water to outside of the container portion.

17. The apparatus of claim 11, wherein an emission wavelength of the light source is selected to fall in a wavelength band in which a quantum yield of the photocatalyst exceeds beyond a predetermined threshold value.

18. A hydrogen gas producing apparatus, comprising:
a container portion which receives water,
a photocatalyst member placed in the container portion to be immersed in the water therein, which member has photocatalyst which generates excited electrons and positive holes when it is irradiated with light, causes a decomposition reaction of the water which decomposes water into hydrogen and oxygen and generates hydrogen gas;
a light source emitting the light which is irradiated to the photocatalyst member and induces the decomposition reaction of the water; and
a heat exchange device which conducts waste heat of the light source to the water in the container portion;
wherein the water to be decomposed on the photocatalyst member in the container portion is warmed by the waste heat of the light source by the heat exchange device,
wherein the light source is operated with electric power obtained by solar power generation and emits the light irradiated to the photocatalyst member while waste heat in the operation of the light source is conducted to the water by the heat exchange device, and
wherein the light source includes two or more LEDs, and a number of operated LEDs in the two or more LEDs is changed so that a light emitting efficiency of the light source will be maximized in accordance with an output current of the solar power generation.

19. The apparatus of claim 18, wherein a density of the light irradiated to the photocatalyst member is adjusted at or lower than a density which gives a photocatalyst efficiency more than a predetermined value, which efficiency is a ratio of an amount of the generated hydrogen gas per photon quantity entering into the photocatalyst.

20. The apparatus of claim 18, wherein the apparatus is configured to confine the light emitted from the light source in the container portion.

21. The apparatus of claim 20, wherein the container portion has a light reflecting mechanism for confining the light emitted from the light source in the container portion.

22. The apparatus of claim 20, wherein the photocatalyst member is a member on which the photocatalyst is formed in layer, and the photocatalyst layer is formed in a thickness that not all the light is absorbed in the photocatalyst when the light enters into the photocatalyst layer for the first time, and the light which penetrated through the photocatalyst member is irradiated again to the photocatalyst member.

23. The apparatus of claim 18, wherein the container portion has a heat insulation mechanism which suppresses heat dissipation from the water to outside of the container portion.

24. The apparatus of claim 18, wherein an emission wavelength of the light source is selected to fall in a wavelength band in which a quantum yield of the photocatalyst exceeds beyond a predetermined threshold value.

* * * * *